US009074041B2

(12) United States Patent
Dettloff et al.

(10) Patent No.: US 9,074,041 B2
(45) Date of Patent: *Jul. 7, 2015

(54) CURABLE EPOXY RESIN COMPOSITIONS AND COMPOSITES MADE THEREFROM

(75) Inventors: Marvin L. Dettloff, Lake Jackson, TX (US); Gary A. Hunter, Lake Jackson, TX (US); Susan K. Falcone-Potts, Clute, TX (US); Ha Q. Pham, Lake Jackson, TX (US); Martine Rousse, Drusenheim (FR); Bernd Hoevel, Sinzheim (DE)

(73) Assignee: Blue Cube IP LLC, Midland, MI (US)

( * ) Notice: Subject to any disclaimer, the term of this patent is extended or adjusted under 35 U.S.C. 154(b) by 290 days.

This patent is subject to a terminal disclaimer.

(21) Appl. No.: 13/389,028

(22) PCT Filed: Sep. 21, 2010

(86) PCT No.: PCT/US2010/049598
§ 371 (c)(1),
(2), (4) Date: Feb. 6, 2012

(87) PCT Pub. No.: WO2011/037895
PCT Pub. Date: Mar. 31, 2011

(65) Prior Publication Data
US 2012/0172493 A1    Jul. 5, 2012

Related U.S. Application Data

(60) Provisional application No. 61/245,966, filed on Sep. 25, 2009.

(51) Int. Cl.
*B32B 27/04* (2006.01)
*B32B 27/20* (2006.01)
*B32B 27/26* (2006.01)
*B32B 27/38* (2006.01)
*C08J 5/24* (2006.01)
*C08G 59/22* (2006.01)
*C08G 59/50* (2006.01)
*C08G 59/56* (2006.01)
*C08G 59/64* (2006.01)
*C08G 59/62* (2006.01)
*C08L 63/00* (2006.01)
*C08K 5/13* (2006.01)

(52) U.S. Cl.
CPC .............. *C08G 59/64* (2013.01); *C08G 59/621* (2013.01); *C08J 5/24* (2013.01); *C08J 2363/02* (2013.01)

(58) Field of Classification Search
None
See application file for complete search history.

(56) References Cited

U.S. PATENT DOCUMENTS

| 3,740,373 | A | 6/1973 | Bentley et al. |
| 3,785,997 | A | 1/1974 | Godfrey et al. |
| 4,683,281 | A | 7/1987 | Goel |
| 4,835,241 | A | 5/1989 | Waddill |
| 4,894,431 | A | 1/1990 | Armbruster et al. |
| 4,925,901 | A | 5/1990 | Bertram et al. |
| 5,026,789 | A | 6/1991 | Weber et al. |
| 5,198,146 | A | 3/1993 | Shomer |
| 5,243,014 | A | 9/1993 | Shomer |
| 5,405,688 | A | 4/1995 | Decker et al. |
| 6,037,435 | A * | 3/2000 | Hayashi et al. ............. 528/103 |
| 6,153,719 | A | 11/2000 | Abbey et al. |
| 6,242,083 | B1 | 6/2001 | McGrail et al. |
| 6,361,866 | B1 | 3/2002 | Ogima et al. |
| 6,572,971 | B2 | 6/2003 | Martin |
| 6,632,893 | B2 | 10/2003 | Konarski et al. |
| 6,887,574 | B2 | 5/2005 | Dean et al. |
| 7,037,958 | B1 | 5/2006 | Hansen et al. |
| 7,163,973 | B2 | 1/2007 | Ahsan |
| 7,414,097 | B2 | 8/2008 | Kuwahara et al. |
| 2005/0171237 | A1 | 8/2005 | Patel et al. |
| 2006/0293172 | A1 | 12/2006 | Rubinsztajn et al. |
| 2012/0010330 | A1* | 1/2012 | Dettloff et al. ............. 523/466 |

FOREIGN PATENT DOCUMENTS

| EP | 0767189 A2 | 4/1997 | |
| EP | 0767189 B1 | 1/2004 | |
| JP | 57008221 A * | 1/1982 | ............ C08G 59/62 |
| WO | 2006005723 | 1/2006 | |
| WO | 2006052727 | 5/2006 | |

OTHER PUBLICATIONS

Translation of JP 57008221 A, provided by the USPTO translations unit (no date).*
Lee, H. Neville, K., "Handbook of Epoxy Resins," McGraw-Hill Book Company, New York, 1967, Chapter 2, pp. 2-1 to 2-33.
Database WPI; Week 199714; Thomson Scientific, London, GB; AN 1997-149843; XP002616175 & JP 9025349 A (Mitsubishi Gas Chem Co Inc); Jan. 28, 1997 *abstract*.
Database WPI; Week 199145; Thomson Scientific, London, GB; AN 1991-329941; XP002616176 & JP 3221537A (Nippon Rec KK); Sep. 30, 1991 *abstract*.

* cited by examiner

*Primary Examiner* — Michael J Feely
(74) *Attorney, Agent, or Firm* — Joe R. Prieto

(57) ABSTRACT

A curable epoxy resin composite composition including a reinforcing material and an epoxy resin composition, and a process for preparing a composite from such composition; wherein a combination of at least one alkanolamine and at least one styrenated phenol are present in the epoxy resin composition in a sufficient amount to increase the rate of reaction of the at least one epoxy resin and the at least one alkanolamine curing agent while maintaining the thermal and mechanical properties of the composite upon curing of the epoxy resin composition.

11 Claims, No Drawings

CURABLE EPOXY RESIN COMPOSITIONS AND COMPOSITES MADE THEREFROM

CROSS REFERENCE TO RELATED APPLICATIONS

This is a §371 application of PCT International Patent Application Number PCT/US2010/049598 filed Sep. 21, 2010, and claims priority from provisional application Ser. No. 61/245,966 filed Sep. 25, 2009, which is incorporated herein by reference in its entirety.

FIELD OF THE INVENTION

This invention relates to thermosettable or curable epoxy resin compositions and to composite articles made from the curable epoxy resin compositions. More specifically, this invention relates to a process for preparing a composite by curing a thermosettable epoxy resin composition wherein the composition includes at least one epoxy resin, at least one alkanolamine curing agent and at least one styrenated phenol; and wherein the styrenated phenol is selected to provide an increase in the rate of reaction between the at least one epoxy resin and the at least one alkanolamine curing agent.

BACKGROUND OF THE INVENTION

Epoxy thermoset resins are one of the most widely used engineering resins, and are well-known for their use in adhesives, coatings and composites. Epoxy resins form a glassy network, exhibit excellent resistance to corrosion and solvents, good adhesion, reasonably high glass transition temperatures, and adequate electrical properties.

A thermosettable or curable epoxy resin formulation typically uses a curing agent, such as an amine curing agent, for crosslinking the epoxy resin to form a cured product such as a composite or laminate. The reactivity of epoxy resin formulations used in composite applications is commonly adjusted by the addition of accelerators. Known standard accelerators for epoxy/amine systems include, for example, bisphenol-A, nonylphenol (NP), the combination of NP and aminoethylpiperazine (AEP), and benzyl-alcohol.

Each of these known accelerators suffers from one or more problems when used in epoxy resin formulations for preparing a cured composite article. For example, while bisphenol-A has the advantage of being very efficient and relatively inexpensive, bisphenol-A has the disadvantage of crystallizing easily in formulated systems, and hence, the use of bisphenol-A creates handling and processing issues. NP presents the disadvantage of having a very negative toxicological profile; the combination of NP and AEP produces an extremely fast and highly exothermic reaction with epoxy compounds; and benzyl-alcohol is volatile, and also significantly decreases the cured properties of an epoxy resin, such as glass transition temperature which is a critical property for many applications.

It is therefore desired to provide a readily available, affordable, accelerator component for epoxy resin formulations; wherein the accelerator has a similar or improved acceleration effect as compared to prior art accelerator systems without the problems of the prior art accelerators and without compromising the overall physical properties of the original epoxy resin formulation containing a curing agent, wherein the epoxy resin formulation is used in producing composites.

SUMMARY OF THE INVENTION

The present invention provides a solution to the problems encountered with the use of prior art accelerators in epoxy/amine formulations by employing a styrenated phenol to accelerate epoxy/amine formulations used in composite applications.

One embodiment of the present invention is directed to a curable epoxy resin composite formulation for preparing a composite shaped article comprising:
(I) a reinforcing material; and
(II) an epoxy resin composition comprising:
 (a) at least one epoxy resin having an average of more than one glycidyl ether group per molecule;
 (b) at least one alkanolamine curing agent; and
 (c) at least one styrenated phenol;
wherein the continuation of the at least one alkanolamine and the at least one styrenated phenol are present in the epoxy resin composition in a sufficient amount to decrease the time to reach a target viscosity or the gel time by a factor of greater than or equal to (≥) about 5 percent (%) of the value for the original formulation which does not contain a combination of the styrenated phenol and an alkanoamine while keeping the glass transition temperature (Tg) at ≥ about 70° C.

Another embodiment disclosed herein relates to a process of preparing the above curable epoxy resin composite composition.

Yet another embodiment disclosed herein relates to a process of producing a cured composite product using the above curable epoxy resin composite composition.

Still another embodiment disclosed herein relates to a cured product produced by the above process. The cured product may be a composite or an adhesive.

Yet another embodiment of the present invention is directed to composite formulations containing reinforcement materials useful in structural composite applications.

Other embodiments and advantages of the present invention will be apparent from the following description and the appended claims.

DETAILED DESCRIPTION OF THE PREFERRED EMBODIMENTS

In its broadest scope, the present invention utilizes a curable epoxy resin composite composition to produce a composite article; wherein the composite composition includes (I) a reinforcing material and (II) an epoxy resin composition comprising (a) at least one or more epoxy resins having an average of more than one glycidyl ether group per molecule; (b) at least one alkanolamine curing agent; and (c) at least one styrenated phenol; wherein the combination of the at least one alkanolamine and the at least one styrenated phenol are present in the epoxy resin composition in a sufficient amount to decrease the time to reach a target viscosity or the gel time by a factor of ≥ about 5% (of the value for the original formulation which does not contain a combination of the at least one epoxy resin, component (a), and the at least one alkanolamine curing agent, component (b), while keeping the glass transition temperature (Tg) at ≥ about 70° C.

The reinforcing material, component (I), useful in the present invention may be any reinforcing material typically used for composites in the art. In one embodiment of the present invention, for example, structural composites may be prepared containing fibers as the reinforcing material. The "reinforcing fibers" may comprise, for example, one or more of carbon fibers, graphite fibers, aramid fibers and fiberglass. In another embodiment, the fiber as the reinforcing material may also include, for example, boron; quartz; aluminum oxide; glass such as E glass, S glass, S-2 GLASS® or C glass; and silicon carbide or silicon carbide fibers containing titanium. Commercially available fibers also may include, example, organic fibers, such as KEVLAR®; aluminum oxide-containing fibers, such as NEXTEL® fibers from 3M; silicon carbide fibers, such as NICALON® from Nippon Carbon; and silicon carbide fibers containing titanium, such as TYRRANO® from Ube.

The fibers may be sized or unsized. The actual types and amounts of sizing agents on the fibers are well known to the skilled artisan.

The fiber reinforcement may have various forms, and may be continuous or discontinuous, or combinations thereof. Continuous strand roving may be used to fabricate unidirectional or angle-ply composites. Continuous strand roving may also be woven into fabric or cloth using different weaves such as plain, satin, leno, crowfoot, and 3-dimensional. Other forms of continuous fiber reinforcement are exemplified by braids, stitched fabrics, and unidirectional tapes and fabrics.

Discontinuous fibers suitable for this invention may include milled fibers, whiskers, chopped fibers, and chopped fiber mats. When the reinforcing material is discontinuous, it may be added in an amount of from about 20 percent by volume to about 60 percent by volume of the composite in some embodiments, and from about 20 percent by volume to about 30 percent by volume of the composite in yet other embodiments. Examples of suitable discontinuous reinforcing materials include milled or chopped fibers, such as glass and calcium silicate fibers. An example of a discontinuous reinforcing material is a milled fiber of calcium silicate (wollastonite; NYAD G SPECIAL®).

A combination of continuous and discontinuous fibers may be used in the same composite. For example, a woven roving mat is a combination of a woven roving and a chopped strand mat, and such woven roving mat is suitable for use in embodiments disclosed herein.

A hybrid comprising different types of fibers may also be used in the present invention. For example, layers of different types of reinforcement may be used. In aircraft interiors, for example, the reinforcing material may include a combination of a fiber and a core. The core may include for example a NOMEX honeycomb core, a foam core made of polyurethane or a foam core made of polyvinylchloride. Another hybrid example of the reinforcing material is the combination of glass fibers, carbon fibers, and aramid fibers.

The amount of reinforcing material in the composition may vary depending on the type and form of the reinforcing material and the expected end product. In some embodiments, the curable epoxy resin compositions of the present invention may include, for example, from about 5 weight percent (wt %) to about 80 wt % reinforcing material based on the total weight of reinforcing material plus the composite resin matrix. In other embodiments, curable compositions may include, for example, from about 35 wt % to about 80 wt % reinforcing material; and in yet other embodiments, curable compositions may include, for example, from about 55 wt % to about 80 wt % reinforcing material.

When the reinforcing material is a fiber, in some embodiments the fiber may be present in a composite at from about 20 percent by volume to about 70 percent by volume; and from about 50 percent by volume to about 65 percent by volume of the composite in other embodiments. In still other embodiments of the present invention, the epoxy resin compositions disclosed herein may be useful in composites, wherein the composite may contain from about 30% to about 70%, in some embodiments, and from about 40% to about 70% in other embodiments, of the high strength filaments or fibers as described above such as carbon, graphite, glass, boron, and the like, based on the total volume of the composite.

The epoxy resin composition, component (II), includes (a) at least one epoxy resin having an average of more than one glycidyl ether group per molecule; (b) at least one alkanolamine curing agent; and (c) at least one styrenated phenol.

The epoxy resin composition, component (II), of the present invention includes at least one epoxy resin, component (a). Epoxy resins are those compounds containing at least one vicinal epoxy group. The epoxy resin may be saturated or unsaturated, aliphatic, cycloaliphatic, aromatic or heterocyclic and may be substituted. The epoxy resin may also be monomeric or polymeric. An extensive enumeration of epoxy resins useful in the present invention is found in Lee, H. and Neville, K., "Handbook of Epoxy Resins," McGraw-Hill Book Company, New York, 1967, Chapter 2, pages 257-307; incorporated herein by reference.

The epoxy resins, used in embodiments disclosed herein for component (a) of the present invention, may vary and include conventional and commercially available epoxy resins, which may be used alone or in combinations of two or more. In choosing epoxy resins for compositions disclosed herein, consideration should not only be given to properties of the final product, but also to viscosity and other properties that may influence the processing of the resin composition.

Particularly suitable epoxy resins known to the skilled worker are based on reaction products of polyfunctional alcohols, phenols, cycloaliphatic carboxylic acids, aromatic amines, or aminophenols with epichlorohydrin. A few non-limiting embodiments include, for example, bisphenol A diglycidyl ether, bisphenol F diglycidyl ether, resorcinol diglycidyl ether, and triglycidyl ethers of para-aminophenols. Other suitable epoxy resins known to the skilled worker include reaction products of epichlorohydrin with o-cresol and, respectively, phenol novolacs. It is also possible to use a mixture of two or more epoxy resins.

The epoxy resins, component (a), useful in the present invention for the preparation of the curable compositions, may be selected from commercially available products. For example, D.E.R. 331, D.E.R.332, D.E.R. 334, D.E.R. 580, D.E.N. 431, D.E.N. 438, D.E.R. 736, or D.E.R. 732 available from The Dow Chemical Company may be used. As an illustration of the present invention, the epoxy resin component (a) may be a liquid epoxy resin, D.E.R.® 383 (DGEBPA) having an epoxide equivalent weight of 175-185, a viscosity of 9.5 Pa-s and a density of 1.16 gms/cc. Other commercial epoxy resins that can be used for the epoxy resin component can be D.E.R. 330, D.E.R. 354, or D.E.R. 332.

Other suitable epoxy resins useful as component (a) are disclosed in, for example, U.S. Pat. Nos. 3,018,262; 7,163,973; 6,887,574; 6,632,893; 6,242,083; 7,037,958; 6,572,971; 6,153,719; and 5,405,688; PCT Publication WO 2006/052727; U.S. Patent Application Publication Nos. 20060293172 and 20050171237, each of which is hereby incorporated herein by reference.

In general, the epoxy resin composition may include from about 15 wt % to about 90 wt % epoxy resin. In other embodiments, the epoxy resin composition may include from about 25 wt % to about 90 wt % epoxy resin; from about 35 wt % to about 90 wt % epoxy resin in other embodiments; from about 45 wt % to about 90 wt % epoxy resin in other embodiments; and from about 55 wt % to about 90 wt % epoxy resin in yet other embodiments.

The epoxy resin composition, component (II), of the present invention also includes at least one curing agent, component (b). The curing agent (also referred to as a hardener or cross-linking agent) useful in the present invention may be any alkanolamine curing agent useful for curing or crosslinking the epoxy resin (a). In the present invention, the alkanolamine useful as a curing agent contains at least one hydroxyl functionality and at least one amine functionality in the compound. Specific examples for the alkanolamine curing agent include propanol amines (for example, 1-amino-2-propanol), ethanolamine (for example, 2-amino-1-ethanol), diethanolamine, triethanolamine, N-methylethanolamine, aminoethylethanolamine (AEEA), and mixtures thereof.

The at least one alkanolamine, in combination with the styrenated phenol, is present in the epoxy resin composition in a sufficient amount to help decrease the time to reach a target viscosity or the gel time by a factor of ≥ about 5% of the value for the original formulation which does not contain a combination of the styrenated phenol and alkanoamine while keeping the Tg ≥ about 70° C. The resulting epoxy resin composition exhibits an excellent balance of properties including low viscosity, such as less than about 1000 centipoise (cp) at room temperature (about 25° C.), and preferably less than about 500 cps. The low viscosity helps fiber wetting. The resulting composite upon curing of the composition also maintains an excellent balance of properties such as for example thermal and mechanical properties.

In some embodiments, the epoxy resin composition of the present invention may include from about 5 wt % to about 25 wt % of an alkanolamine curing agent. In other embodiments, the epoxy resin composition may include from about 5 wt % to about 20 wt % of an alkanolamine curing agent. In yet other embodiment, the epoxy resin composition may include from about 5 wt % to about 16 wt % of an alkanolamine curing agent. Below the amount of 5 wt % of the alkanolamine curing agent, the acceleration effect rapidly decreases; and above the amount of 25 wt % of the alkanolamine curing agent, no additional acceleration benefit is observed.

The epoxy resin composition, component (II), of the present invention also includes at least one styrenated phenol, component (c). The suitable styrenated phenol accelerator component used in the present invention advantageously assists formulators to simplify formulations and provide formulations that can be handled much more easily than currently known formulations. The suitable styrenated phenol accelerator, in combination with the alkanolamine, used in the present invention helps to decrease the time to reach a target viscosity or the gel time by a factor of ≥ about 5% of the value for the original formulation which does not contain a combination of the styrenated phenol and alkanolamine. The suitable styrenated phenol accelerator component, in combination with the alkanolamine, also advantageously helps keep the Tg ≥ about 70° C.

The styrenated phenol useful in the present invention may include for example the specific styrenated phenol materials described in WO/2006/005723, Japanese Patent Application S62-16132 and Japanese Patent Application No. 2008-88348, all of which are incorporated herein by reference. A preferred styrenated phenol used in the present invention may include, for example, the mono-styrylphenol (MSP-75) available from SI Group, Inc.

None of these prior art references disclose a process utilizing a styrenated phenol, in combination with an alkanolamine, as an accelerator and none of these prior art references disclose a process for producing a composite product using a combination of styrenated phenol and an alkanolamine Styrenated phenols as candidates for producing composites are any styrenated phenols that exhibit enhanced reactivity in epoxy resin formulations. Nowhere in the prior art is there disclosed or recognized that a styrenated phenol, in combination with an alkanolamine, can be a suitable replacement for known accelerators used in a curable epoxy resin/amine curing agent formulation for preparing composites and that decreases the time to reach a target viscosity or the gel time by a factor of ≥ about 5% of the value for the original formulation which does not contain the styrenated phenol and alkanolamine.

Other liquid styrenated C1-4-alkyl-substituted phenols that may also be employed herein to accelerate epoxy resin formulations of the present invention include for example monostyrenated p-cresol or o-cresol. Typical alkylated phenols, component (c), useful in the present invention include for example cresol, p-tert-butylphenol, p-octylphenol, p-nonylphenol, dodecylphenol, octadecylphenol, styrenated phenol, decylphenol, undecylphenol, tetradecylphenol, hexadecylphenol, isomers of these compounds as well as mixtures and the like such as the corresponding fused ring phenols called naphthols. The phenols may be mono-, di- and tri-alkylated substituted phenols. Preferably, the alkylated phenols useful in the present invention may be the monoalkylated phenols. Most preferably, the alkylated phenols may be nonylphenol (commercially available from the SI Group) and monostyrenated phenol such as MSP-75 (commercially available from the SI Group) which are both liquids at room temperature.

The at least one styrenated phenol, in combination with the alkanolamine, is present in the epoxy resin composition in a sufficient amount to help decrease the time to reach a target viscosity or the gel time by a factor of ≥ about 5% of the value for the original formulation which does not contain a combination of the styrenated phenol and alkanoamine while keeping the Tg ≥ about 70° C. The resulting composite upon curing of the composition also maintains an excellent balance of properties such as for example thermal and mechanical properties.

For example, in some embodiments, the epoxy resin composition of the present invention may include from about 1 wt % to about 65 wt % styrenated phenol. In other embodiments, the styrenated phenol present in the epoxy resin composition is from about 1 wt % to about 50 wt %. In yet other embodiments, the styrenated phenol present in the epoxy resin composition is from about 1 wt % to about 30 wt %. The concentration of the styrenated phenol in the composition may depend on the end use for the composition. The level of styrenated phenol has to be balanced with the desired mechanical properties in a structural composite.

In some embodiments, in order to obtain the desired effect, styrenated phenol may be added to the epoxy resin composition in a concentration of from about 1 wt % to about 40 wt % styrenated phenol; and from about 1 wt % to about 15 wt % styrenated phenol in yet other embodiments. Below the amount of 1 wt % of styrenated phenol, the acceleration effect of reaction of the epoxy resin with the alkanolamine curing agent is substantially reduced; and at higher levels above the amount of 65 wt % of the styrenated phenol, the mechanical properties of the structural composite may be decreased relative to the original formulation that does not contain the combination of styrenated phenol and alkanolamine.

The combination of styrenated phenol and alkanolamine of the present invention is used to accelerate the reactivity of an epoxy resin formulation that contains both of these compounds relative to a formulation that does not contain both of these compounds. Relative reactivity can be measured in different ways. For example, Method B in DIN 16945 entitled "Testing of resins, hardeners and accelerators, and catalyzed resins" may be used to obtain the relative reactivity of samples of resin formulations. The method, Method B in DIN 16945, includes the step of measuring the time it takes for a free flowing reaction mixture to reach the gel point (the point at which the resin is no longer flowable) at the test temperature. A faster curing formulation will reach its gel point in a shorter period of time (i.e. ≥5%) as compared to a slower curing control formulation as shown in the Examples herein below.

Another method to measure the relative reactivity of samples of resin formulations is to measure the relative increase in viscosity with time of the resin formulations. For example, ASTM D-445 entitled "Standard Test Method for Kinematic Viscosity of transparent and opaque liquids (and calculation of dynamic viscosity) may be used to obtain the relative reactivity of samples of resin formulations. A faster curing formulation will show a shorter time to reach a target viscosity value compared to a slower curing control formulation as will be shown in the Examples herein below.

As an illustration of one embodiment of the present invention, a styrenated phenol may be used to accelerate the reaction rate of aminoethylethanolamine (AEEA) with an epoxy compound. Similar to the combination of AEP and NP, the acceleration effect of combining a styrenated phenol with AEEA is unique to these two compounds. Other alkyl phenols like NP widely used to achieve the same effect with other types of amines does not work with AEEA. For example, the combination of AEEA, styrenated phenol and a tertiary amine such as tris(2,4,4-dimethylaminomethyl)phenol (DMP30) produces reaction rates and exotherm characteristics approaching that of AEP and NP.

In some embodiments of the present invention, in particular where a further increase in reactivity is desired for the epoxy resin composition, an optional catalyst or an accelerator may be used in the present invention composition to increase its reactivity. For example, the epoxy resin composition, component (II) of the present invention may include at least one catalyst, as an added optional component, which catalyzes the reaction of an epoxy resin with a curing agent. The catalyst may be used to assist further the styrenated phenol in the reaction between the epoxy component (a) and the curing agent component (b). The catalyst may be a single component or a combination of two or more different catalysts.

For example, catalysts/accelerators may include arenesulfonates such as methyl p-toluenesulfonate as disclosed in German Patent No. DE 1770045; salicylic acid as disclosed in U.S. Pat. Nos. 3,740,373 and 7,414,097; methanesulfonic acid as disclosed in U.S. Pat. No. 3,785,997 and U.S. Pat. No. 4,894,431; triphenyl phosphite as disclosed in U.S. Pat. No. 4,683,281; DMP30 as disclosed in European Patent EP 767189; methylamine adducts of polyglycidyl ethers such as neopentyl glycol diglycidyl ether as disclosed in European Patent EP 783010; trimethylopropane triacrylate as disclosed in U.S. Pat. No. 4,835,241; calcium nitrate as disclosed in U.S. Pat. Nos. 5,243,014 and 5,198,146; 2,4,6-tris(dimethylaminomethyl) phenol (such as Ancamine K54 commercially available from Air Products); benzyldimethylamine and other well known catalysts/accelerators in the industry which are those knowledgeable in the art of catalyzing epoxy-amine reactions. All of the above references disclosing catalysts/accelerators are hereby incorporated by reference.

Any of the well known optional catalysts, for example such those described in U.S. Pat. No. 4,925,901, may also be used in the present invention. As an illustration, examples of the known catalysts that may be used in the present invention include for example, suitable onium or amine compounds such as ethyltriphenyl phosphonium acetate, ethyltriphenyl phosphonium acetate-acetic acid complex, triethylamine, methyl diethanolamine, and benzyldimethylamine; imidazole compounds such as 2-methylimidazole and benzimidazole; DMP 30; and mixtures thereof.

The catalyst, when present in the epoxy resin composition, is employed in a sufficient amount to result in a substantially complete cure of the epoxy resin, with some cross-linking. For example, the catalyst may be used in an amount of from about 0.01 to about 5 parts per hundred parts of resin, with from about 0.01 to about 1.0 part per hundred parts of resin being preferred and from about 0.02 to about 0.5 per hundred parts of resin being more preferred.

One or more other additional optional hardeners or curing agents that are different from the alkanolamine curing agents may be used in the epoxy resin composition of the present invention to promote further crosslinking of the epoxy resin composition to form a polymer composition. The other optional curing agent component, herein referred to as a co-curing agent, may include any compound having an active group being reactive with the epoxy group of the epoxy resin. As with the epoxy resin, the curing agents may be used individually, or as a mixture of two or more co-curing agents.

The co-curing agent may be selected from any generally known to those skilled in the art as being effective to open the epoxide ring to enable polymerization and crosslinking. Examples of the co-curing agent useful in the present invention include phenol-containing compounds, amines, combinations thereof, and the like. Additional co-curing agents or hardeners useful in the present invention may be found in EP-A2 373 440, which is incorporated herein by reference in its entirety.

One embodiment of the co-curing agent may include primary and secondary polyamines and their adducts and polyamides. For example, polyfunctional amines may include aliphatic amine compounds such as diethylene triamine (D.E.H. 20, available from The Dow Chemical Company), triethylene tetramine (D.E.H. 24, available from The Dow Chemical Company), tetraethylene pentamine (D.E.H. 26, available from The Dow Chemical Company), as well as adducts of the above amines with epoxy resins, diluents, or other amine-reactive compounds. Aromatic amines, such as metaphenylene diamine and diamine diphenyl sulfone, aliphatic polyamines, such as amino ethyl piperazine and polyethylene polyamine, and aromatic polyamines, such as metaphenylene diamine, diamino diphenyl sulfone, and diethyltoluene diamine, may also be used as the co-curing agent. Preferred amine co-curing agents contain a sterically hindered amine group wherein an alkyl, cycloalkyl or aralkyl group is in close proximity to the amine group so that it is less reactive than in the case where the alkyl, cycloalkyl or aralkyl group is absent. Some products containing hindered amine groups are polyetheramines (for example, Jeffamine D-230 from Huntsman Chemical), isophorone diamine (for example, Vestamin IPD from Evonik), menthanediamine (for example, Primene MD from Dow Chemical), bis(4-amino-3-methylcyclohexyl) methane (for example, Laromin C-260 from BASF), and combinations thereof.

The amount of the optional co-curing agent used in the present invention may vary from about 1 part per hundred parts epoxy resin to about 50 parts per hundred parts epoxy resin, by weight, in some embodiments. In other embodiments, the optional co-curing agent may be used in an amount ranging from about 1 part per hundred parts epoxy resin to about 28 parts per hundred parts epoxy resin, by weight; and in yet other embodiments, the co-curing agent may be used in an amount ranging from about 1 part per hundred parts epoxy resin to about 15 parts per hundred parts epoxy resin, by weight.

The epoxy resin composition, component (II), of the present invention may also include one or more optional additives conventionally found in epoxy resin systems. For example, the epoxy resin composition of the present invention may contain additives such as catalysts; other curing agents; other resins; fillers such as wollastonite, barites, mica, feldspar, talc, silica, fumed silica, glass, metal powders, and calcium carbonate; aggregates such as glass beads, polytetrafluoroethylene, polyol resins, polyester resins, phenolic resins, graphite, molybdenum disulfide and abrasive pigments; viscosity reducing agents; boron nitride; nucleating agents; dyes; pigments such as titanium dioxide, carbon black, iron oxides, chrome oxide, and organic pigments; coloring agents; thixotropic agents, photo initiators; latent photo initiators, latent catalysts; inhibitors; flow modifiers; accelerators; desiccating additives; surfactants; adhesion promoters; fluidity control agents; stabilizers; ion scavengers; UV stabilizers; flexibilizers; fire retardants; diluents that aid processing; toughening agents; wetting agents; mold release agents; coupling agents; tackifying agents; and any other substances which are required for the manufacturing, application or proper performance of the composition. These optional additives may have an effect on the properties of the epoxy resin composition, before and/or after curing, and should be taken into account when formulating the epoxy resin composite composition and the desired reaction product.

Generally, the amount of the other optional additives used in the present invention may vary from 0 to about 80 parts per hundred parts epoxy resin; from about 0.01 to about 80 parts per hundred parts epoxy resin, by weight, in some embodiments. In other embodiments, the optional additives may be used in an amount ranging from about 0.05 to about 70 parts per hundred parts epoxy resin, by weight; and the additives may be used in an amount ranging from about 0.1 to about 60 parts per hundred parts epoxy resin, by weight, in yet other embodiments. Those skilled in the art will be aware of the effects of and choices for these additives and appropriate use of such is considered to be well within the skill of those working in the art.

The epoxy resin composition, component (II), may be prepared by admixing the components including (a) at least one epoxy resin having an average of more than one glycidyl ether group per molecule; (b) at least one alkanolamine curing agent; and (c) at least one styrenated phenol in the appropriated amounts to provide a sufficient increase the rate of reaction of the at least one epoxy resin, component (a), and the at least one alkanolamine curing agent, component (b).

The epoxy resin composition of the present invention may be prepared by admixing all of the components of the composition together by known procedures. For example, the epoxy resin composition of the present invention can be produced by preparing a first composition (e.g., "Side A" in the Examples) comprising the epoxy resin component and a second composition (e.g., "Side B" in the Examples) comprising the curing agent component. All other components useful in making the epoxy resin composition may be present in the same composition, or some may be present in the first composition, and some in the second composition. The first composition is then mixed with the second composition to form the epoxy resin composition which is curable because of the presence of the curing agent. Preferably, the epoxy resin composition is in the form of a solution or a varnish which can be used for producing a composite article.

It is advantageous to prepare the epoxy resin composition such that the viscosity of the epoxy resin composition can be adjusted easily. The preparation of the composition is also carried out such that the thermal and mechanical properties of the resulting composite upon curing of the epoxy resin composition are maintained.

The curable epoxy resin composite formulation for preparing a composite shaped article may be prepared by admixing (I) a reinforcing material; and (II) an epoxy resin composition described above. The epoxy resin composition mixture described above may be prepared first and then combined with a reinforcing material. The combined composition mixture may then be cured to produce an epoxy resin composite thermoset material.

The curable epoxy resin composite composition disclosed herein has an improved reaction rate by including at least one styrenated phenol in the curable epoxy resin composite formulation from which composites can be made. In addition, the composition formulation provides a composite which maintains excellent thermal and mechanical properties as described below.

One of the benefits of employing at least one styrenated phenol in the epoxy resin composition of the present invention is that the styrenated phenol has excellent solubility with all of the other components of the formulations which helps ensure the reaction mixture is homogeneous. Another of the benefits of employing at least one styrenated phenol in the epoxy resin composition of the present invention is that the styrenated phenol is a low viscosity (e.g., less than about 500 cps) liquid which helps reduce the viscosity of the formulation and makes the formulation easier to process as compared to a formulation which does not contain the styrenated phenol.

Once the reinforcing material is combined with the epoxy resin composition, the resulting curable composite formulation of the present invention can be cured under conventional processing conditions to form a thermoset. The resulting thermoset displays excellent thermo-mechanical properties, such as good toughness and mechanical strength, while maintaining high thermal stability.

The process to produce the composites or thermoset products of the present invention may be performed by utilizing casting, potting, encapsulation, and impregnation processes such as gravity casting, vacuum casting, automatic pressure gelation (APG), vacuum pressure gelation (VPG), infusion, filament winding, lay up injection, transfer molding, resin injection molding (SEEMAN, SCRIMP, VARTM) and the like.

In one embodiment, the composite may be formed by applying the curable epoxy resin composition to the reinforcing material as described above, such as by impregnating or coating the reinforcing material, and then curing the curable epoxy resin composition with the reinforcing material.

Fiber reinforced composites, for example, may be formed by hot melt prepregging. The prepregging method is characterized by impregnating bands or fabrics of continuous fiber with a thermosetting epoxy resin composition as described herein in molten form to yield a prepreg, which is laid up and cured to provide a composite of fiber and thermoset resin.

Other processing techniques can be used to form composites containing the epoxy-based compositions disclosed herein. For example, filament winding, solvent prepregging, and pultrusion are typical processing techniques in which the uncured epoxy resin may be used. Moreover, fibers in the form of bundles may be coated with the uncured epoxy resin composition, laid up as by filament winding, and the cured to form a composite.

In one illustration of the present invention, styrenated phenol is used in an epoxy/amine formulation which is typically used in composite applications such as for example in a process for manufacturing glass laminates for wind mill blades. The adjustment of the reactivity is possible by adding the styrenated phenol to the amine hardener used for such application. Styrenated phenol presents the advantage of being liquid so this property eliminates the crystallization problem caused by for example used by bisphenol A.

The compositions of the present invention may be cured under ambient conditions or by heating. Curing of the compositions disclosed herein may be carried out at a temperature of at least about 20° C. and up to about 200° C., for periods of minutes up to hours, depending on the epoxy resin, curing agent, and catalyst (if used). In other embodiments, curing may occur at a temperature of at least about 70° C., for periods of minutes up to hours. Post-treatments may be used as well, such post-treatments ordinarily being at temperatures between about 70° C. and about 200° C.

In some embodiments, curing may be staged to prevent exotherms. Staging, for example, includes curing for a period of time at a temperature followed by curing for a period of time at a higher temperature. Staged curing may include two or more curing stages, and may commence at temperatures below about 40° C. in some embodiments, and below about 80° C. in other embodiments.

Generally, the temperature to cure the curable epoxy resin composite composition may be selected between about 20° C. to about 300° C., preferably between about 25° C. to about 250° C., and more preferably between about 30° C. to about 220° C. Below the curing temperature of 20° C., the temperature is too low to ensure sufficiently fast reaction under conventional processing conditions. Above the temperature of 300° C., the temperature is too high and the thermosetting material may degrade.

The post cure of the curable composition may be performed at temperature of generally higher than about 100° C., preferably higher than about 110° C., more preferably higher than about 120° C., even more preferably higher than about 130° C., and most preferably higher than about 140° C.

The curing time of the thermosetting resin may be chosen, for example, between about 1 minute to about 96 hours, preferably between about 5 minutes to about 48 hours, and more preferably between about 10 minutes to about 24 hours. Below 1 minute, the time is too short to ensure sufficient reaction under conventional processing conditions. Above 96 hours, the time is too long to be of practical interest.

The final thermoset of the present invention displays superior mechanical and thermal properties. That is, the cured resin of the present invention advantageously exhibits various properties that make the resin useful for making composites. Generally, the cured resin should meet the minimum standards in the industry such as for example minimum standards related to the procedures and properties of laminating resins including, for example, tensile properties, bending strength, and water absorption. For example, minimum standards may be those established by Germanischer Lloyd through its GL Industrial Services GmbH organization, which is an inspection, certification and technical consultancy company. The Germanischer Lloyd minimum standards for certain properties are known and conventionally acknowledged by those skilled in the art. These standards for the properties are described in the following Table A.

TABLE A

Germanischer Lloyd Minimum Properties for Laminating Resins

| PROPERTY | MEASUREMENT METHOD | RESULTS |
| --- | --- | --- |
| Tensile Properties | DIN EN ISO 527-2 | |
| Tensile Strength, Mpa | | 55 |
| Fracture Strain, % | | 2.5 |
| Modulus of Elasticity, Mpa | | 2700 |

TABLE A-continued

Germanischer Lloyd Minimum Properties for Laminating Resins

| PROPERTY | MEASUREMENT METHOD | RESULTS |
| --- | --- | --- |
| Bending Strength | DIN EN ISO 178 | |
| Flexural Strength, Mpa | | 100 |
| Heat Deflection Temperature, ° C. | | 70 |
| Water Absorption | DIN EN ISO 175 | |
| Weight, gain after 168 hours Immersion @ 23° C., mg | | ≤50 |

The following examples illustrate, but do not limit, the present invention. All parts and percentages are based upon weight, unless otherwise specified.

Examples 1 and 2; and Comparative Example A, B and C

Example 1, Example 2, Comparative Example A, Comparative B, and Comparative Example C were handled according to the following general procedure:

A Side A was prepared by mixing in the desired ratios the components, D.E.R.* 330, an epoxy resin having an epoxy equivalent weight (EEW) of 170-190 (commercially available from The Dow Chemical Company) and 1,4-Butanediol diglycidyl ether (BDDGE). The mixing was conducted at room temperature (23° C. and 50% humidity). On a lab scale, 500 grams of Side A were prepared at one time; and the mixing operation lasted 10 minutes.

In one example, Side B was comprised of Airstone* 724H amine curing agent (commercially available from The Dow Chemical Company). In other Examples, Side B was comprised of several components that were mixed in the same manner as Side A. About 100 grams of Side B was prepared at one time.

Side A and B were mixed together in the desired amounts for 2 minutes using a standard rotational agitator. Then the "start" switch of a Gel Norm equipment was pressed to make sure all measurements start from the same reference time. Then 100 grams of formulation were poured into a glass tube (specified by the Gel Norm RVN Gel Timer method according to DIN 16945 [89]). A gel timer spindle (specified in the Gel Norm method) was immersed inside of the tube and allowed to rotate. The viscosity of the mixture was automatically recorded with time. The experiments stopped by themselves when the system was cured. The used tubes were disposed of at the end of the experiment.

In the examples, the Tg value were measured by differential scanning calorimetry (DSC) on a clear casting (no fiber present) cured for 7 hours at 70° C. The following method was used:

Tg 1 was obtained using the half extrapolated tangent method for measuring the change in the heat flow curve generated by running the DSC from 25° C. to 200° C. at 10° C. per minute; and Tg 2 was similarly determined after cooling the same sample from 200° C. to 25° C. at 30° C. per minute followed by a second DSC scan from 25° C. to 150° C. at 10° C. per minute.

Comparative Example A (Table 1) is based on amine curing agent Airstone 724H. No alkanolamine or styrenated phenol was present in Comparative Example A. Examples 1 and 2 (Table II and III, respectively) are based on the combination of AEEA and styrenated phenol. The gel times are >5% of Comparative Example A. The Tg values are greater than 70° C.

Comparative Example B (Table IV) and Comparative Example C (Table V) are two formulations that were prepared in an attempt at obtaining high reactivity without using an alkanolamine and/or a styrenated phenol. Comparative Example B does not contain a styrenated phenol and an alkanolamine. While the Tg values are >70° C. for Comparative Example B, Comparative Example B gels 10 minutes later than Example 1 (42% gel time reduction) and 13 minutes later than Example 2 (54% gel time reduction). Comparative Example C contains styrenated phenol but no alkanolamine. The Tg values are >70° C. for Comparative Example C, but Comparative Example C gels 7 minutes later than Example 1 (33% gel time reduction) and 10 minutes later than Example 2 (47% gel time reduction).

The compositions for the above examples and the results of the above procedures (for example, the Tg properties of the compositions) are described in the following Tables I to V.

TABLE I

Comparative Example A

| COMPONENTS | | Weight (pbw) |
|---|---|---|
| Side A | | |
| Epoxy resin | D.E.R.* 330 | 92 |
| | 1,4-Butanediol diglycidyl ether (BDDGE) | 8 |
| Side B | | |
| Curing agent | Airstone* 724H[a] | 35 |
| PROPERTIES | | |
| Gel Time @ 23° C. (minutes) | | 15 |
| Tg1/Tg2 (° C.) - DSC | | 79/82 |

[a]Airstone* 724H is a commercially available amine hardener
*Trademark of the Dow Chemical Company

TABLE II

Example 1

| COMPONENTS | | Weight (pbw) |
|---|---|---|
| Side A | | |
| Epoxy resin | D.E.R.* 330 | 92 |
| | 1,4-Butanediol diglycidyl ether (BDDGE) | 8 |
| Side B | | |
| Amine curing agent | Aminoethylethanolamine (AEEA) | 19.2 |
| Phenolic Compound | Styrenated phenol | 4.8 |
| PROPERTIES | | |
| Gel Time @ 23° C. (minutes) | | 14 |
| Gel Time reduction compared to Comparative Example A | | 6% |
| Tg1/Tg2 (° C.) - DSC | | 81/82 |

TABLE III

Example 2

| COMPONENTS | | Weight (pbw) |
|---|---|---|
| Side A | | |
| Epoxy resin | D.E.R.* 330 | 92 |
| | 1,4-Butanediol diglycidyl ether (BDDGE) | 8 |

TABLE III-continued

Example 2

| | | Weight (pbw) |
|---|---|---|
| Side B | | |
| Amine curing agent | Aminoethylethanolamine (AEEA) | 19.2 |
| Phenolic compound | Styrenated phenol | 10.3 |
| PROPERTIES | | |
| Gel Time @ 23° C. (minutes) | | 11 |
| Gel Time reduction compared to Comparative Example A | | 27% |
| Tg1/Tg2 (° C.) - DSC | | 75/78 |

TABLE IV

Comparative Example B

| COMPONENTS | | Weight (pbw) |
|---|---|---|
| Side A | | |
| Epoxy resin | D.E.R.* 330 | 92 |
| | 1,4-Butanediol diglycidyl ether (BDDGE) | 8 |
| Side B | | |
| Amine curing agents | 1,3-Bis(aminomethyl)cyclohexane (1,3 BAC) | 5.78 |
| | D.E.H.* 52 (adduct of diethylenetriamine and liquid bisphenol-A epoxy resin type D.E.R.* 330) | 17.35 |
| Catalyst/accelerator | Ethyl p-toluenesulfonate (EPTS) | 3.62 |
| PROPERTIES | | |
| Gel Time @ 23° C. (minutes) | | 24 |
| Tg1/Tg2 (° C.) - DSC | | 114/120 |

TABLE V

Comparative Example C

| COMPONENTS | | Weight (pbw) |
|---|---|---|
| Side A | | |
| Epoxy resin | D.E.R.* 330 | 92 |
| | 1,4-Butanediol diglycidyl ether (BDDGE) | 8 |
| Side B | | |
| Amine curing agents | D.E.H.* 52 (adduct of diethylenetriamine and liquid bisphenol-A epoxy resin type D.E.R.* 330) | 24.66 |
| Phenolic compound | Styrenated phenol | 5.78 |
| PROPERTIES | | |
| Gel Time @ 23° C. (minutes) | | 21 |
| Tg1/Tg2 (° C.) - DSC | | 95/110 |

Examples 3 and 4; and Comparative Example D

The gel times shown in Table VI below were measured using a Gardco Standard Gel Timer (model GT-S available from The Paul N. Gardner Company, Inc. located in Pampano Beach, Fla.). This device has a low torque synchronous motor that rotates a specially shaped stirrer in the formulation. As gelation starts to occur, drag exceeds torque and the motor stalls. The time at which the motor stalls is reported as the gel time and it is displayed on the Gel Timer's LCD display.

Comparative Example D shows the gel time, Tg and some flex and tensile properties of a cured formulation that does not contain both styrenated phenol and an alkanolamine. Examples 3 and 4 are similar to Comparative Example D but both Examples 3 and 4 have a combination of styrenated phenol and an alkanolamine in different amounts. Example 3 shows a 43% decrease in gel time compared to Comparative Example D. Example 3 has a Tg >70° C. and its flex and tensile properties are comparable. Example 4 shows that at higher levels of styrenated phenol and alkanolamine gelation occurs even faster (a 90% reduction in gel time compared to Comparative D). The Tg is still >70° C. and its flex and tensile properties are still high.

TABLE VI

| COMPOSITION | Comparative Example D | Example 3 | Example 4 |
|---|---|---|---|
| PART A | | | |
| D.E.R. ® 383, BADGE | 63.5 | 63.5 | 63.5 |
| ChemMod 67 (from Polystar LLC), BDDGE | 5.5 | 5.5 | 5.5 |
| PART B | | | |
| Jeffamine D230, Polyetheramine | 23.3 | 20.6 | 10.2 |
| Vestamin IPD, Isophorone diamine | 7.8 | 7.6 | 6.8 |
| ChemCure 206 (from Polystar LLC), alkanolamine | 0 | 2.0 | 10.2 |
| Styrenated Phenol (MSP-75 from SI Group, Inc.) | 0 | 0.7 | 3.7 |
| PROPERTIES OF COMPOSITION | | | |
| 25° C. Cup Gel Time, 100 gm, minutes | 550 | 314 | 55 |
| PROPERTIES OF COMPOSITE (after curing composition 7 hours at 70° C.) DSC Analysis according to method DIN 53765 | | | |
| DSC $T_g1$, ° C. | 82 | 81 | 84 |
| DSC $T_g2$, ° C. | 98 | 97 | 99 |
| Tensile test according to method EN ISO 527-2 | | | |
| Peak Stress, MPa | 79.4 | 68.4 | 72.2 |
| Modulus, MPa | 4073 | 3698 | 4181 |
| % Elongation @ Peak | 4.7 | 4.2 | 4.6 |
| % Elongation @ Break | 7.7 | 5.3 | 7.8 |
| Flexural properties according to method EN ISO 178 | | | |
| Ultimate Flex Strength, MPa | 143.7 | 127.8 | 123.8 |
| % Strain at Break | 7.8 | 9.9 | 10.0 |
| Modulus, MPa | 4001 | 3639 | 3252 |

While the present disclosure includes a limited number of embodiments, the scope of the present invention should be limited only by the attached claims and not by the embodiments herein as other embodiments are possible to those skilled in the art having benefit of this disclosure.

The invention claimed is:

1. A curable epoxy resin composite composition comprising:
(I) a reinforcing material; and
(II) a curable epoxy resin composition;
wherein the reinforcing material (I) is present in an amount of from about 5 weight percent to about 80 wt % of the total weight of (I) and (II); wherein the curable epoxy resin composition (II) wets the reinforcing material (I); wherein curable epoxy resin composition (II) comprises (a), (b), (c), and (d):
(a) from about 15 weight percent to about 90 weight percent of at least one epoxy resin having an average of more than one glycidyl ether group per molecule, based on the overall weight of the curable epoxy resin composition (II);
(b) from about 5 weight percent to about 25 weight percent of at least one alkanolamine curing agent, based on the overall weight of the curable epoxy resin composition (II); wherein the at least one alkanolamine is selected from the group consisting of propanol amine, ethanolamine, diethanolamine, triethanolamine, N-methylethanolamine, aminoethylethanolamine, and mixtures thereof;
(c) from about 1 weight percent to about 40 weight percent of at least one liquid styrenated phenol, based on the overall weight of the curable epoxy resin composition (II); wherein the at least one liquid styrenated phenol has a viscosity of less than about 500 centipoise at about 25° C.; and
(d) from about 1 part to about 50 parts of a co-curing agent per hundred parts of epoxy resin present in the curable epoxy resin composition (II); wherein the co-curing agent is different from the alkanolamine curing agent;
provided that the amounts of (a), (b), (c), and (d) result in a curable epoxy resin composition (II) having a viscosity of less than about 1,000 centipoise at about 25° C.;
wherein the combination of the at least one liquid styrenated phenol (c) and the at least one alkanolamine curing agent (b) accelerates the reactivity of the curable epoxy resin composition (II), as indicated by gel time or time required to achieve a target viscosity; and
wherein upon curing of the curable epoxy resin composite composition, the cured epoxy resin composite composition forms a cured composite having a glass transition temperature greater than or equal to about 70° C. and a balance of thermal and mechanical properties to meet Germanischer Lloyd minimum standards for tensile properties, bending strength and water absorption.

2. The curable epoxy resin composite composition of claim 1, wherein the at least one epoxy resin (a) comprises a diglycidyl ether of bisphenol A.

3. The curable epoxy resin composite composition of claim 2, wherein the at least one epoxy resin (a) further comprises an epoxy resin different from the diglycidyl ether of bisphenol A.

4. The curable epoxy resin composite composition of claim 3, wherein the epoxy resin different from the diglycidyl ether of bisphenol A is 1,4-butanediol diglycidyl ether.

5. The curable epoxy resin composite composition of claim 1, wherein the at least one liquid styrenated phenol (c) comprises a monostyrenated phenol.

6. The curable epoxy resin composite composition of claim 1, wherein the reinforcing material (I) is a fibrous reinforcement.

7. The curable epoxy resin composite composition of claim 1, wherein the curable epoxy resin composition (II) further comprises at least one other resin or at least one filler.

8. A process for producing a cured product comprising curing the curable epoxy resin composite composition of claim 1 to form a cured product.

9. The process of claim 8, wherein the curing comprises two or more stages.

10. A cured composite product produced by the process of claim 8.

11. A process for producing a curable epoxy resin composite composition comprising contacting together:
(I) a reinforcing material; and
(II) a curable epoxy resin composition;
wherein the reinforcing material (I) is present in an amount of from about 5 weight percent to about 80 wt % of the total weight of (I) and (II); wherein the curable epoxy resin composition (II) wets the reinforcing material (I); wherein the curable epoxy resin composition (II) comprises (a), (b), (c), and (d):
(a) from about 15 weight percent to about 90 weight percent of at least one epoxy resin having an average of more than one glycidyl ether group per molecule, based on the overall weight of the curable epoxy resin composition (II);
(b) from about 5 weight percent to about 25 weight percent of at least one alkanolamine curing agent, based on the overall weight of the curable epoxy resin composition (II); wherein the at least one alkanolamine is selected from the group consisting of propanol amine, ethanolamine, diethanolamine, triethanolamine, N-methylethanolamine, aminoethylethanolamine, and mixtures thereof;
(c) from about 1 weight percent to about 40 weight percent of at least one liquid styrenated phenol, based on the overall weight of the curable epoxy resin composition (II); wherein the at least one liquid styrenated phenol has a viscosity of less than about 500 centipoise at about 25° C.; and
(d) from about 1 part to about 50 parts of a co-curing agent per hundred parts of epoxy resin present in the curable epoxy resin composition (II); wherein the co-curing agent is different from the alkanolamine curing agent;
provided that the amounts of (a), (b), (c), and (d) result in a curable epoxy resin composition (II) having a viscosity of less than about 1,000 centipoise at about 25° C.;
wherein the combination of the at least one liquid styrenated phenol (c) and the at least one alkanolamine curing agent (b) accelerates the reactivity of the curable epoxy resin composition (II), as indicated by gel time or time required to achieve a target viscosity; and
wherein upon curing of the curable epoxy resin composite composition, the cured epoxy resin composite composition forms a cured composite having a glass transition temperature greater than or equal to about 70° C. and a balance of thermal and mechanical properties to meet Germanischer Lloyd minimum standards for tensile properties, bending strength, and water absorption.

\* \* \* \* \*